United States Patent
Matsuda

(10) Patent No.: US 10,741,838 B2
(45) Date of Patent: Aug. 11, 2020

(54) POSITIVE-ELECTRODE ACTIVE MATERIAL POWDER, POSITIVE ELECTRODE CONTAINING POSITIVE-ELECTRODE ACTIVE MATERIAL POWDER, AND SECONDARY BATTERY

(71) Applicant: SANTOKU CORPORATION, Kobe-shi, Hyogo (JP)

(72) Inventor: Motofumi Matsuda, Kobe (JP)

(73) Assignee: SANTOKU CORPORATION, Kobe-shi, Hyogo (JP)

( * ) Notice: Subject to any disclaimer, the term of this patent is extended or adjusted under 35 U.S.C. 154(b) by 342 days.

(21) Appl. No.: 15/103,641

(22) PCT Filed: Dec. 12, 2014

(86) PCT No.: PCT/JP2014/082996
§ 371 (c)(1),
(2) Date: Jun. 10, 2016

(87) PCT Pub. No.: WO2015/088007
PCT Pub. Date: Jun. 18, 2015

(65) Prior Publication Data
US 2016/0315320 A1    Oct. 27, 2016

(30) Foreign Application Priority Data
Dec. 13, 2013  (JP) .................. 2013-257908

(51) Int. Cl.
*H01M 4/525* (2010.01)
*H01M 10/0525* (2010.01)
(Continued)

(52) U.S. Cl.
CPC ........... *H01M 4/525* (2013.01); *H01M 4/366* (2013.01); *H01M 4/381* (2013.01); *H01M 4/382* (2013.01);
(Continued)

(58) Field of Classification Search
CPC .... H01M 4/525; H01M 10/052; H01M 4/366; H01M 4/485; H01M 4/505; H01M 4/131; H01M 10/0525; H01M 2004/021
See application file for complete search history.

(56) References Cited

U.S. PATENT DOCUMENTS 9,929,409 B2 *  3/2018  Kim .................. H01M 4/62
2001/0046628 A1  11/2001  Oesten et al.
(Continued)

FOREIGN PATENT DOCUMENTS

| CN | 1731605 A | 2/2006 |
| CN | 101785134 A | 7/2010 |

(Continued)

OTHER PUBLICATIONS

State Intellectual Property Office of the P.R.C.: Communication dated Apr. 4, 2018 in counterpart application No. 201480074267.3.
(Continued)

*Primary Examiner* — Imran Akram
(74) *Attorney, Agent, or Firm* — Sughrue Mion, PLLC

(57) ABSTRACT

Provided is cathode active material powder or a cathode that is capable of improving the cycle characteristics of non-aqueous electrolyte rechargeable batteries at high voltage and exhibiting excellent capacity retention. The powder has a composition of: $Li_{x-w}Na_wCo_{1-y}M_yO_{2+z}$ ($0.950 \leq x \leq 1.100$, $0 < y \leq 0.050$, $-0.1 \leq z \leq 0.1$, $0 \leq w \leq 0.020$; M: rare earth elements, Ti, Zr, Mo, Mn, Ni, Cu, Al, Ga, etc), and a core-shell structure composed of a lithium-containing composite oxide region as core and a Li-ion-conductive oxide region as shell. The core contains Li, Co, and oxygen, and has Co concentration of not higher than 90% as calculated by formula: ((Co concentration on shell external surface)/(Co concentration at
(Continued)

shell boundary of core/shell structure))×100. The shell is an amorphous layer containing La, Ti, Co, and oxygen, covering the core at least partly.

12 Claims, 3 Drawing Sheets

(51) Int. Cl.
  *H01M 4/36* (2006.01)
  *H01M 4/505* (2010.01)
  *H01M 4/38* (2006.01)
  *H01M 4/02* (2006.01)
  *H01M 10/052* (2010.01)

(52) U.S. Cl.
  CPC ....... *H01M 4/505* (2013.01); *H01M 10/0525* (2013.01); *H01M 10/052* (2013.01); *H01M 2004/028* (2013.01); *H01M 2220/30* (2013.01)

(56) References Cited

U.S. PATENT DOCUMENTS

| | | | |
|---|---|---|---|
| 2008/0118829 | A1 | 5/2008 | Nanno |
| 2008/0318131 | A1 | 12/2008 | Watanabe et al. |
| 2009/0081554 | A1 | 3/2009 | Takada et al. |
| 2010/0019194 | A1 | 1/2010 | Fujiwara et al. |
| 2010/0143802 | A1* | 6/2010 | Takei ................. H01M 4/366 429/223 |
| 2010/0173199 | A1 | 7/2010 | Hiraki et al. |
| 2011/0076556 | A1 | 3/2011 | Karthikeyan et al. |
| 2011/0081578 | A1 | 4/2011 | Chang et al. |
| 2011/0117433 | A1 | 5/2011 | Sabi et al. |
| 2012/0074351 | A1 | 3/2012 | Levasseur et al. |
| 2012/0328945 | A1 | 12/2012 | Hirose et al. |
| 2013/0040196 | A1* | 2/2013 | Hosoe ................. H01G 11/28 429/211 |
| 2013/0149616 | A1 | 6/2013 | Lee et al. |
| 2014/0017576 | A1* | 1/2014 | Kim ................. H01M 4/5825 429/403 |
| 2014/0079990 | A1 | 3/2014 | Yanagida et al. |
| 2014/0212759 | A1 | 7/2014 | Blangero et al. |
| 2016/0006032 | A1 | 1/2016 | Paulsen et al. |

FOREIGN PATENT DOCUMENTS

| | | |
|---|---|---|
| CN | 102064337 A | 5/2011 |
| CN | 102842733 A | 12/2012 |
| JP | 2001-313034 A | 11/2001 |
| JP | 2008-152923 A | 7/2008 |
| JP | 2012-43794 A | 3/2012 |
| JP | 2012-046362 A | 3/2012 |
| JP | 2012-138197 A | 7/2012 |
| JP | 2012-252964 A | 12/2012 |
| WO | 2007/004590 A1 | 1/2007 |
| WO | 2009/157524 A1 | 12/2009 |
| WO | 2012/165207 A1 | 12/2012 |
| WO | 2012/171780 A1 | 12/2012 |

OTHER PUBLICATIONS

International Searching Authority, International Search Report of PCT/JP2014/082996 dated Mar. 24, 2015 [PCT/ISA/210].

Chen-Zhang Lu et al., "Electrochemical performance of $LiCoO_2$ cathodes by surface modification using lanthanum aluminum garnet", Journal of Power Sources, 2008, vol. 184, pp. 392-401.

International Searching Authority, International Preliminary Report on Patentability with translation of Written Opinion dated Jun. 23, 2016, issued in application No. PCT/JP2014/082996.

European Patent Office, Communication dated May 11, 2017 issued in counterpart European Application No. 14869523.2.

\* cited by examiner

POSITIVE-ELECTRODE ACTIVE MATERIAL POWDER, POSITIVE ELECTRODE CONTAINING POSITIVE-ELECTRODE ACTIVE MATERIAL POWDER, AND SECONDARY BATTERY

CROSS REFERENCE TO RELATED APPLICATIONS

This application is a National Stage of International Application No. PCT/JP2014/082996, filed Dec. 12, 2014, claiming priority based on Japanese Patent Application No. 2013-257908, filed Dec. 13, 2013, the contents of all of which are incorporated herein by reference in their entirety.

FIELD OF ART

The present invention relates to cathode active material powder for nonaqueous electrolyte rechargeable batteries that is useful in rechargeable batteries having excellent capacity retention even in high-voltage charging, a cathode for nonaqueous electrolyte rechargeable batteries in which the powder is used, and a nonaqueous electrolyte rechargeable battery.

BACKGROUND ART

Lithium ion batteries as a nonaqueous electrolyte rechargeable battery are widely used in portable electronic devices, such as video cameras, mobile audio equipment, mobile phones, and notebook computers, which have been becoming smaller, lighter, and more powerful. For these electronic devices, lithium ion batteries of larger capacity and longer life have consistently been demanded. On the other hand, with the recent change in environment of use of these mobile devices, characteristics that are desired of the batteries have also been changing. In particular, batteries have recently been demanded that may be used in a stable manner even if charged at a high voltage of 4.3 V or higher, which is one of the conditions for achieving a larger battery capacity.

Under such high voltage conditions, the cathode of a lithium ion battery is prematurely deteriorated. This is due to the reaction of the cathode active material and the electrolyte to deteriorate the cathode active material, resulting in degradation of the battery life, that is, the cycle characteristics.

As one of the solutions to this problem, it is conceivable to avoid direct contact between a cathode active material and electrolyte. As means for avoiding the direct contact, there is known, for example, a method of inhibiting reaction between a cathode active material and electrolyte by providing a coating material, such as an oxide, over the surface of a cathode active material.

For example, Patent Publication 1 proposes a cathode active material coated with one or more layers of an oxide of at least one metal selected from the group consisting of Zr, Al, Si, Ti, La, Y, Sn, Zn, Mg, Ca, and Sr.

Patent Publication 2 proposes a cathode active material composed of lithium-containing composite oxide particles containing Li and at least one transition metal element selected from Ni, Co, or Mn, to which surface powder of an oxide of at least one metal element selected from Zr, Ti, Sn, Mg, Ba, Pb, Bi, Nb, Ta, Zn, Y, La, Sr, Ce, In, or Al adhere.

Patent Publication 1: JP-2001-313034-A
Patent Publication 2: JP-2012-138197-A

SUMMARY OF THE INVENTION

The techniques disclosed in these publications, however, have problems in that cycle characteristics at a maximum charge voltage of not lower than 4.5 V, in particular as high as over 4.5V, are not sufficiently good, leading to significant decrease in battery capacity retention.

It is an object of the present invention to provide cathode active material powder or a cathode that is capable of improving cycle characteristics of nonaqueous electrolyte rechargeable batteries at a high voltage and providing excellent capacity retention.

It is another object of the present invention to provide a nonaqueous electrolyte rechargeable battery having excellent capacity retention and cycle characteristics even after repeated high-voltage charging.

According to the present invention, there is provided cathode active material powder for a nonaqueous electrolyte rechargeable battery, said cathode active material powder having a composition represented by formula (I):

$$Li_{x-w}Na_wCo_{1-y}M_yO_{2+z} \qquad (I)$$

wherein x, y, z, and w satisfy $0.950 \leq x \leq 1.100$, $0 < y \leq 0.050$, $-0.1 \leq z \leq 0.1$, $0 \leq w \leq 0.020$, respectively; M is one or more elements selected from the group consisting of K, Mg, Ca, Y, rare earth elements, Ti, Zr, Hf, V, Nb, Ta, Cr, Mo, W, Mn, Fe, Ni, Cu, Ag, Zn, B, Al, Ga, C, Si, Sn, N, P, S, F, and Cl, and a core-shell structure consisting of a lithium-containing composite oxide region as a core and a Li-ion-conductive oxide region as a shell, wherein said core comprises Li, Co, and oxygen, and has a Co concentration of not higher than 90% as calculated by formula (II):

$$((\text{Co concentration on external surface of shell})/(\text{Co concentration at shell boundary of core/shell structure})) \times 100 \qquad (II)$$

and wherein said shell is an amorphous layer comprising La, Ti, Co, and oxygen, covering said core at least partly (sometimes referred to as the present cathode active material powder or present powder hereinbelow).

According to the present invention, there is also provided a cathode for a nonaqueous electrolyte rechargeable battery comprising the present cathode active material powder, an electrically conductive material, and a binder (sometimes referred to as the present cathode hereinbelow).

According to the present invention, there is further provided a rechargeable battery comprising the present cathode, an anode, a nonaqueous electrolyte, and a separator.

According to the present invention, there is further provided use of cathode active material powder in the manufacture of a nonaqueous electrolyte rechargeable battery, said cathode active material powder having a composition represented by the above formula (I), and a core-shell structure consisting of a lithium-containing composite oxide region as a core and a Li-ion-conductive oxide region as a shell, wherein said core comprises Li, Co, and oxygen, and has a Co concentration of not higher than 90% as calculated by the above formula (II), and wherein said shell is an amorphous layer comprising La, Ti, Co, and oxygen, covering said core at least partly.

The cathode active material powder and the cathode according to the present invention adopt the above-mentioned structure, in particular, the core/shell structure having a particular composition, in the powder of the present invention, and the structure of the shell is amorphous. Thus the cathode active material powder and the cathode according to the present invention have excellent structural stability and, when employed in a nonaqueous electrolyte rechargeable battery, produce less reaction with electrolyte. Consequently, such a nonaqueous electrolyte rechargeable battery provides suppressed deterioration of the cathode active material even in high-voltage charging, ensures excellent capacity retention, and has excellent cycle characteristics.

DETAILED DESCRIPTION OF THE INVENTION

Figure 1:
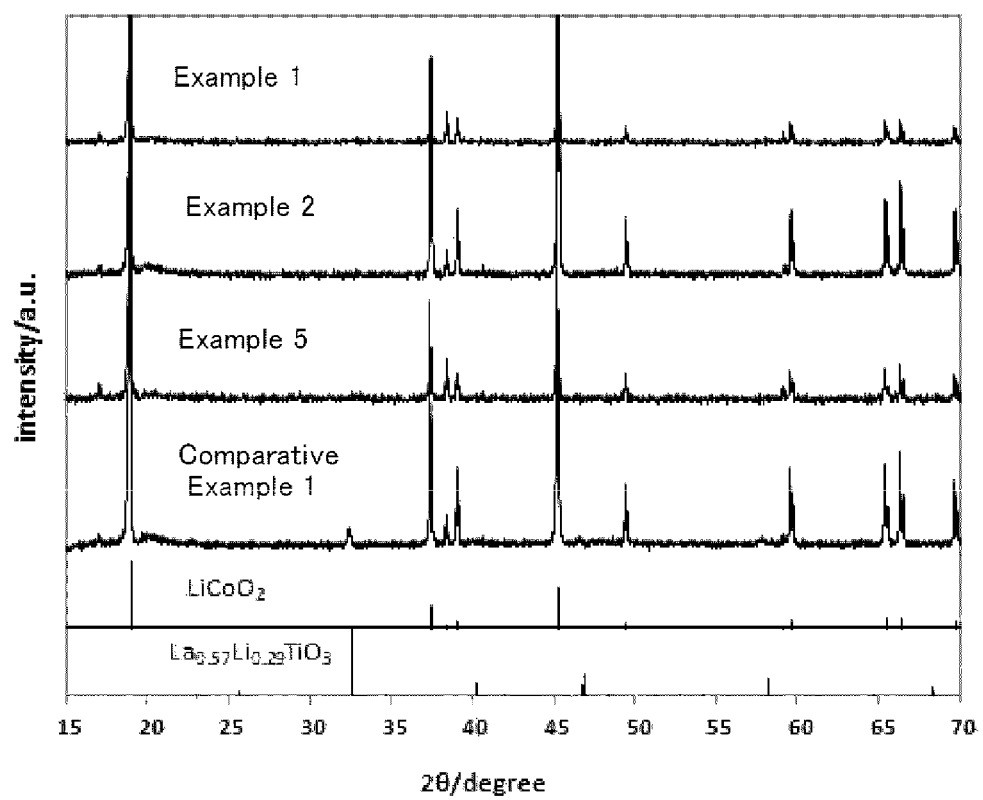
FIG. 1 shows X-ray diffraction patterns of the cathode active material powders prepared in Examples 1, 2, and 5, and Comparative Example 2.

The present invention will now be explained in detail below.

The cathode active material powder according to the present invention has the composition represented by above formula (I), and a core-shell structure consisting of a particular lithium-containing composite oxide region as the core and a particular Li-ion-conductive oxide region as the shell, and is useful in nonaqueous electrolyte rechargeable batteries.

In formula (I), the values represented by x, y, w, and z are the contents of the respective elements in mole.

Denoted by x is the sum of Li and Na. The range of x is $0.950 \leq x \leq 1.100$, preferably $0.980 \leq x \leq 1.050$. When x is less than 0.950, stability of a rechargeable battery under Li ion elimination, in particular, continuous charging characteristics, may be poor, whereas when x is more than 1.100, the charge/discharge capacity and the cycle characteristics may be deteriorated.

In formula (I), (x−w) denotes the amount of Li. The amount of Li, in a rechargeable battery subjected to charge/discharge, varies due to intercalation/deintercalation. When the amount of Li is larger than the stoichiometric amount, the stability under the Li ion elimination tends to be improved, whereas when the amount is slightly smaller than the stoichiometric, the charge/discharge capacity and the cycle characteristics tend to be improved. For improved cycle characteristics with balanced stability and capacity retention, the range of (x−w) is preferably $0.930 \leq (x-w) \leq 1.080$, more preferably $0.960 \leq (x-w) \leq 1.030$.

In formula (I), w denotes the amount of Na. Na, in the core of the present powder, is capable of inhibiting disintegration of the crystal structure of the core during charging where Li ions are eliminated. This is assumed to be because Na ions, compared to Li ions, have less mobility and require more time for extraction by voltage application, so that Na ions tend to inhibit disintegration of the crystal structure to thereby improve the durability during charging. Thus, in the powder of the present invention, the Na is preferably present particularly in the core.

By optimizing the w value, disintegration may be inhibited of the crystal structure of the core caused by elimination of Li ions particularly during continuous charging or high-voltage charging at not lower than 4.3 V, which eventually contributes to the safety and stability of rechargeable batteries.

Since Na is larger in ion radius than Li, partial substitution of Li with Na expands the interlayer distance, which may be confirmed by powder X-ray diffraction (XRD) wherein the peak is shifted toward the lower angle side, compared to a material without Na. The range of w is $0 \leq w \leq 0.020$, preferably $0 < w \leq 0.020$, more preferably $0.002 \leq w \leq 0.018$. When w is over 0.020, Na is in excess, which may deteriorate the effect of maintaining the crystal structure of the core, adversely affecting the battery characteristics of a rechargeable battery.

In formula (I), y denotes the amount of element M, and the sum of the amounts of Co and element M is 1. Element M is one or more elements selected from the group consisting of K, Mg, Ca, Y, rare earth elements, Ti, Zr, Hf, V, Nb, Ta, Cr, Mo, W, Mn, Fe, Ni, Cu, Ag, Zn, B, Al, Ga, C, Si, Sn, N, P, S, F, and Cl. Element M may not be present, or may be present for the purpose of improving various battery characteristics, or as inevitable impurities. The range of y is $0 < y \leq 0.050$, preferably $0.005 \leq y \leq 0.030$. When element M in the amount of more than 0 is present, the stability of the crystal structure of the core is improved, whereas when the amount of M is over 0.050, the charge/discharge capacity of a rechargeable battery may be poor.

In formula (I), (1−y) denotes the amount of Co. The range of (1−y) is $0.95 \leq 1-y < 1.00$.

In the formula, (2+z) denotes the amount of oxygen. The range of z is $-0.1 \leq z \leq 0.1$, and determined by the amounts of Li, Co, and element M.

In the present powder having a core/shell structure, the lithium-containing composite oxide region as the core contains Li, Co, and oxygen. When the present powder is used in a rechargeable battery, the intercalation material having Li-ion-absorbing/desorbing function, i.e. the cathode active material, is crystalline, layered $LiCoO_2$ usually formed of the Li, Co, and oxygen contained in the core.

In this $LiCoO_2$, Li may partially be substituted with Na. In other words, the core may contain Na. Usually, the substitution with the Na is preferably not more than 0.020 moles.

In $LiCoO_2$, Co may partially be substituted with one or more elements selected from the group consisting of K, Mg, Ca, Y, rare earth elements, Ti, Zr, Hf, V, Nb, Ta, Cr, Mo, W, Mn, Fe, Ni, Cu, Ag, Zn, B, Al, Ga, C, Si, Sn, N, P, S, F, and Cl, in particular one or more elements selected from the group consisting of K, Mg, Ca, Y, Ti, Zr, Hf, V, Nb, Ta, Cr, Mo, W, Mn, Fe, Ni, Cu, Ag, Zn, B, Al, Ga, C, Si, Sn, N, P, S, F, and Cl. In other words, the core may contain at least one of these substitution elements. Usually, the total amount of substitution with these substitution elements is preferably not more than 0.050 moles.

In the present powder, the core may contain, in addition to Li, Co, and oxygen, the substitution elements for Li and/or the substitution elements for Co.

In the core, the molar amount of Li or the total molar amount of Li and Na is preferably 0.950 to 1.100 moles with respect to 1 mole of Co or 1 mole of Co and the substitution elements for Co together.

In the present powder, the shell is an amorphous layer containing La, Ti, Co, and oxygen, covering the core at least partly. As used herein, "covering the core at least partly" means to cover usually not less than 50%, preferably not less than 70%, more preferably 80 to 100% of the core. The shell forms a Li-ion-conductive oxide region where Li ions or the like may pass through, which are absorbed into and/or desorbed from the intercalation material, such as $LiCoO_2$, in the core. The Li-ion-conductive oxide region, which covers, as an amorphous layer, the core at least partly as discussed above, may prevent, when the present powder is adopted in a cathode of a rechargeable battery, the direct contact between the core and an electrolyte solution more effectively, and sufficiently suppress deterioration of the present powder due to repeated charge/discharge of the rechargeable battery. In general, the deterioration due to the contact between a cathode active material powder and an electrolyte solution is more likely when a rechargeable battery is charged at a higher voltage. The present powder may effectively suppress the deterioration caused by such high-voltage charging.

The thickness (average layer thickness) of the amorphous layer constituting the shell is preferably not less than 5 nm, more preferably not less than 10 nm, and not more than 2000 nm, more preferably not more than 1000 nm. In less than 5 nm, inhibition of the direct contact between the core and an electrolyte solution is insufficient, and the deterioration of the cathode active material may not be suppressed sufficiently, whereas in over 2000 nm, the resistance to ion conduction on the shell external surface may be high, resulting in reduction in discharge voltage.

Here, the thickness of the amorphous layer is determined with a scanning X-ray photoelectron spectroscope (PHI 5000 VersaProbe II, ULVAC-PHI, INC.) by etching the layer into the depth direction while quantitatively analyzing La or Ti, until the etching depth at which the detected La or Ti value is equivalent to the La or Ti compositional value in the core. Quantitative determination of the depth is made through conversion from the conditions under which a $SiO_2$ sample is etched into a prescribed depth. If the shell is relatively thick and hard to be etched into the shell-core boundary under the routine conditions, the thickness may be estimated by extrapolation on the basis of an approximation formula obtained from the downward trend of the detected La or Ti value, provided that it is preferred to verify the validity of the estimated value through measurement or observation by another means, such as observation under SEM.

The amorphous as mentioned above means that no or extremely weak, if detected, diffraction peak is detected at 32.5±1.0° in powder X-ray diffraction (XRD) in a X-ray diffractometer (Ultima IV, RIGAKU CORPORATION). As used herein, extremely small means that the diffraction peak intensity, with the background subtracted, is not higher than 3% of the peak intensity in the (003) plane of $LiCoO_2$.

Due to the amorphous structure of the shell, the differential stress between the core and the shell which expand/contract during charge/discharge of a rechargeable battery is relaxed, which improves the durability and the adhesivity to the core of the shell, resulting in improved cycle characteristics.

The amorphous layer as the shell is a Li-ion-conductive oxide region containing La, Ti, Co, and oxygen, and may optionally contain alkali metal elements, such as Li, Na, or K, as desired. The composition of the shell may suitably be decided, taking the composition of the present powder represented by formula (I) into consideration.

Co in the shell is distributed so that the Co concentration (at %) calculated from formula (II) above is not higher than 90%, and preferably has a concentration gradient of decreasing Co content from the shell boundary of the core-shell structure toward the shell external surface. With this concentration gradient, the resistance and the separation due to the difference in expansion/contraction rates at the interface of the core-shell structure may be alleviated.

La in the shell is preferably distributed so that the La concentration (at %) calculated from formula (III) is not higher than 5%, in particular 0%:

(La concentration at the shell boundary of the core-shell structure/La concentration on the shell external surface)×100 (III)

It is more preferred that La has a gradient of decreasing concentration from the shell external surface toward the shell boundary of the core-shell structure. The 0% distribution of the La concentration (at %) calculated from formula (III) may be employed in the detection of the boundary of the core-shell structure in the determination of the thickness of the amorphous layer using the scanning X-ray photoelectron spectroscope discussed above.

With this concentration gradient, the resistance and the separation due to the difference in expansion/contraction rates at the interface of the core-shell structure may be alleviated.

Ti in the shell is preferably distributed so that the Ti concentration (at %) calculated from formula (IV) is not higher than 5%, in particular 0.1 to 5%:

(Ti concentration at the shell boundary of the core-shell structure/Ti concentration on the shell external surface)×100 (IV)

It is more preferred that the Ti has a gradient of decreasing concentration from the shell external surface toward the boundary of the core-shell structure.

With this concentration gradient, the resistance and the separation due to the difference in expansion/contraction rates at the interface of the core-shell structure may be alleviated.

In the cathode active material powder of the present invention, the ratio of the lithium-containing composite oxide region as the core to the Li-ion-conductive oxide region as the shell may be determined from the amount of the shell coating the core with respect to the core. The amount of the coating shell may be estimated from the production examples of the present powder to be discussed later herein, specifically through conversion from the amounts of the primary elements used in coating the core precursor particles prepared in the production examples with the raw shell material.

In the cathode active material powder of the present invention, the ratio of Co concentration A (at %) in the core to Co concentration B on the shell external surface (A/B) is preferably 1.1 to 5.0, more preferably 2.0 to 5.0, most preferably 2.3 to 4.5. At a concentration ratio (A/B) of over 5.0, the differential stress between the core and the shell which expand/contract during charge/discharge of a rechargeable battery may not be relaxed, causing deterioration of the cycle characteristics, whereas at less than 1.1, the Co amount on the surface of the present cathode active material powder is too large, and sufficient inhibition of the reaction with an electrolyte solution in a rechargeable battery may not be achieved, resulting in deterioration of the cycle characteristics.

The specific surface area of the cathode active material powder of the present invention is preferably not smaller than 0.1 $m^2/g$, more preferably not smaller than 0.2 $m^2/g$, and preferably not larger than 1.0 $m^2/g$, more preferably not larger than 0.7 $m^2/g$. With the specific surface area within the range, sufficient contact area may be secured between the cathode active material powder and an electrolyte solution to improve the efficiency of elimination/insertion of Li ions, which improves the average voltage. With the specific surface area of less than 0.1 $m^2/g$, Li ion migration resistance is high and the battery characteristics is poor, whereas with the specific surface area of over 1.0 m$^2$/g, the electrode density may be low.

The specific surface area may be determined by the BET method using nitrogen gas adsorption. A measurement apparatus may be, for example, Macs orb HM-1210 manufactured by MOUNTECH CO., LTD.

The particle diameter of the cathode active material powder of the present invention is usually 1 to 40 μm, preferably 2 to 25 μm, in average particle diameter (D50).

The average particle diameter may be determined by particle size distribution analysis using laser diffraction.

The method for producing the cathode active material powder according to the present invention is not particularly limited as long as the present powder is obtained. For example, the present powder may be produced by preparing core precursor particles for use in forming the lithium-containing composite oxide region as the core, then coating the core precursor particles with a raw shell material so as to cover the core precursor particles at least partly, and calcining.

The core precursor particles may be obtained by mixing a lithium compound as a lithium source, a cobalt compound as a cobalt source, and optionally a sodium compound as a sodium source and/or an M compound as an M source, and calcining. Here, M is the element M in formula (I) discussed above.

Examples of the lithium compound may include inorganic salts, such as lithium hydroxide, lithium chloride, lithium nitrate, lithium carbonate, and lithium sulfate; and organic salts, such as lithium formate, lithium acetate, or lithium oxalate.

Examples of the cobalt compound may include oxide, hydroxide, carbonate, and oxyhydroxide of cobalt, and cobalt oxide is particularly preferred. The shape of the core generally succeeds to the shape of the cobalt compound. Thus, in order to achieve desired shape, particle size, and particle size distribution of the core precursor particles, it is preferred to select a raw material cobalt compound having the properties corresponding to these particle properties.

Examples of the sodium compound may include inorganic salts, such as sodium hydroxide, sodium chloride, sodium nitrate, sodium carbonate, and sodium sulfate; and organic salts, such as sodium formate, sodium acetate, and sodium oxalate.

Examples of the M compound, though depending on the selected element M, may include oxides, hydroxides, carbonates, sulfates, nitrates, or halides containing M; or gas containing M.

In the production of the core precursor particles, first, a lithium compound, a cobalt compound, and optionally a sodium compound and an M compound are separately measured out in predetermined amounts, and mixed. The mixing may be carried out in a ball mill or the like according to a known manner, and preferably in a high-speed stirring mixer for higher dispersion.

Next, the mixture thus obtained is calcined. The calcining may be carried out in a bogie hearth furnace, a kiln furnace, a mesh belt furnace, or the like, according to a known manner, usually at 950 to 1050° C. for 1 to 24 hours. Preferred calcination temperature is 1030 to 1050° C. The calcination may also be carried out by preliminary calcination at a temperature lower than the above-mentioned calcination temperature, followed by raising up to the calcination temperature, or by calcination at the above-mentioned calcination temperature, followed by annealing at a lower temperature. The preliminary calcination or the annealing may be performed preferably at 500 to 800° C. for about 30 minutes to about 6 hours.

As preferred preparation of the core precursor particles, aside from the mixing and calcination of separate compounds for Li, Na, Co, and element M as discussed above, Co and element M may be compounded into a composite oxide by co-precipitation, and the obtained composite oxide is mixed with a Li compound and optionally a Na compound, and calcined.

Next, for example, the core precursor particles are coated at least partly with a raw shell material and calcined, to thereby obtain the present powder. This may be carried out, for example, generally by the following steps but not limited thereto:

Step 1: dissolve in pure water a nitrate of La, such as lanthanum nitrate, and a sulfate of Ti, such as titanyl sulfate, to prepare solution (1), Step 2: prepare aqueous sodium carbonate solution (2) for use in pH adjustment, Step 3: add core precursor particles into solution (2) under stirring to prepare dispersion (1), Step 4: add solution (1) dropwise into dispersion (1) to prepare dispersion (2), wherein when the dropwise addition is completed, confirm that the pH change of dispersion (2) over 3 minutes is within ±0.01 and stable, Step 5: filter dispersion (2) and wash the resulting cake with pure water, and Step 6: calcine the washed cake under such calcination conditions as to form a shell of an amorphous layer, to thereby obtain cathode active material powder of the present invention.

The calcination conditions in Step 6 is preferably at a calcination temperature of not lower than 550° C. and not higher than 700° C. and calcination for 1 to 24 hours.

Through Steps 4 to 6, part of Co in the core precursor particles migrates into the shell being formed, so that the shell containing Co is formed. The shell may contain Co introduced by dissolving a Co compound in solution (1).

Through Steps 4 to 6, a small amount of Li may be migrated from the core precursor particles into the shell being formed.

The obtained cathode active material powder may be washed. In particular, when the cathode active material powder contains Na, residual Na that has not been dissolved between the oxide layers may be removed by washing. With this process, when the cathode active material powder is used in a rechargeable battery, less Na ions are released into the electrolyte solution, by-reaction that disturbs the lithium ion migration in the electrolyte solution may be suppressed, and degradation by Na of the charge/discharge characteristics may be minimized.

Next, the cathode of the nonaqueous electrolyte rechargeable battery of the present invention is discussed.

The cathode of the present invention contains the present cathode active material powder, an electrically conductive material, and a binder. With the present cathode active material powder, when the cathode is fabricated into a rechargeable battery, the contact between the core in the present powder and the electrolyte solution may be reduced to suppress the reaction with the electrolyte solution.

Examples of the electrically conductive material may include carbonaceous materials, such as natural graphite, artificial graphite, Ketjen black, and acetylene black.

Examples of the binder may include fluororesins, such as polytetrafluoroethylene and polyvinylidene fluoride, polyvinyl acetate, polymethyl methacrylate, ethylene-propylenebutadiene copolymer, styrene-butadiene copolymer, acrylonitrile-butadiene copolymer, and carboxymethyl cellulose.

The cathode of the present invention may be produced by a known process, for example, by kneading the present cathode active material powder, the electrically conductive material, and the binder in a dispersion medium into slurry, applying the slurry to an electrode plate, drying the slurry, rolling with a roller, and cutting into a predetermined size. By using the present cathode active material powder in the slurry preparation discussed above, an electrode slurry may be obtained wherein the cathode active material powder, the electrically conductive material, and the binder are uniformly dispersed, and which exhibits moderate fluidity and small change with the lapse of time.

The thickness of the cathode of the present invention is preferably 40 to 120 μm.

Examples of the dispersion medium may include N-methylpyrrolidone, tetrahydrofuran, ethylene oxide, methyl ethyl ketone, cyclohexanone, methyl acetate, methyl acrylate, diethyltriamine, dimethylformamide, and dimethylacetamide.

The electrode plate may be a porous or nonporous conductive substrate. Examples of such a conductive substrate may include metal foils, such as Al, Cu, Ti, or stainless steel foils. Aluminum metal foil of 10 to 30 μm thick is particularly preferred.

The rechargeable battery according to the present invention is a nonaqueous electrolyte rechargeable battery having the present cathode, an anode, nonaqueous electrolyte, and a separator. In particular, with the use of the present cathode, the crystal structure of the present powder is stabilized during charge/discharge cycles, which results in high cycle characteristics.

The rechargeable battery according to the present invention may be composed, for example, of a battery case, the present cathode, an anode, nonaqueous electrolyte, and a separator. Examples of the nonaqueous electrolyte may include electrolyte solution composed of an organic solvent and electrolyte, solid electrolyte, or so called gel-type electrolyte wherein nonaqueous electrolyte solution is retained in a polymer.

The anode may be obtained, for example, by applying an anode mixture containing an anode active material, a binder, an electrically conductive material, a dispersion medium, and the like, on a collector made of metal foil, such as of Cu, rolling, and drying.

The anode active material may be, for example, a lithium metal, a lithium alloy, or a carbonaceous material, such as amorphous carbon, e.g., soft carbon or hard carbon, artificial graphite, or natural graphite. The binder and the dispersion medium may be similar to those used in the cathode, as necessary.

The organic solvent for use in the electrolyte solution is not particularly limited, and may be, for example, carbonates, such as propylene carbonate, ethylene carbonate, dimethyl carbonate, diethyl carbonate, or ethyl methyl carbonate; ethers, such as 1,2- or 1,3-dimethoxypropane, tetrahydrofuran, or 2-methyltetrahydrofuran; esters, such as methyl acetate or γ-butyrolactone; nitriles, such as acetonitrile or butylonitrile; or amides, such as N,N-dimethylformamide or N,N-dimethylacetamide. One or a combination of two or more of these may be used.

The electrolyte to be dissolved in the organic solvent may be, for example, $LiClO_4$, $LiPF_6$, $LiBF_4$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, short-chain aliphatic lithium carboxylate, lithium tetrachloroborate, lithium tetraphenylborate, or imides. One or a combination of two or more of these may be used.

The solid electrolyte may be, for example, polymer electrolytes, such as polyethylene oxide electrolyte; crystalline inorganic solid electrolytes; or sulfate electrolytes, such as $Li_2S$—$SiS_2$, $Li_2S$—$P_2S_5$, or $Li_2S$—$B_2S_3$.

The separator may preferably be, for example, a microporous membrane having high ion permeation, prescribed mechanical strength, and electrical insulation. Use of microporous membrane made of, for example, polyethylene, polypropylene, polyphenylenesulfide, polyethylene terephthalate, polyamide, or polyimide, is preferred for its hydrophobicity and resistance to a nonaqueous electrolyte, and one or a combination of a plurality of these may be used. In view of the production cost, inexpensive polypropylene microporous membrane may preferably be used.

The rechargeable battery according to the present invention may take various shapes, such as cylindrical, laminated, or coin shapes. In any shape, the rechargeable battery may be fabricated by placing the above-mentioned constituent components in a battery case, connecting the cathode and the anode to a cathode terminal and an anode terminal, respectively, with collector leads, and sealing the battery case.

EXAMPLES

The present invention will now be explained in more detail with reference to Examples and Comparative Examples, which do not intend to limit the present invention.

[Evaluation Test: Evaluation of Nonaqueous Electrolyte Rechargeable Battery]

<Charge/Discharge Test 1>

A charge/discharge test was conducted on the coin cell rechargeable battery fabricated in Examples and Comparative Examples.

(1) At the measuring temperature of 25° C., the battery was subjected to charging/discharging at 0.3 mA/cm² between the maximum charging voltage of 4.5 V and the minimum discharging voltage of 3.0 Vat the first and second cycles.
(2) At the third cycle and thereafter, the charging/discharging was carried out at 1.5 mA/cm² between the maximum charging voltage of 4.5 V and the minimum discharging voltage of 3.0 V.
(3) The capacity retention (%) after 22 cycles was obtained by the following formula:

Capacity retention (%)=(Discharge capacity at 22nd cycle/Discharge capacity at 3rd cycle)×100

The discharge capacity at the first cycle and the capacity retention after 22 cycles are shown in Table 2.

<Charge/Discharge Test 2>

The discharge capacity at the first cycle and the capacity retention (%) after 22 cycles were measured in the same way as in Charge/Discharge Test 1, except that the maximum charging voltage was 4.6 V. The results are shown in Table 2.

Example 1

<Production of Cathode Active Material Powder>

100.3 g of lithium carbonate, 210 g of cobalt oxide, 2.4 g of aluminum hydroxide, 1.2 g of magnesium hydroxide, 0.2 g of titanium oxide, and 0.3 g of zirconium oxide were separately measured out. Each raw material used was in the form of powders to avoid aggregation. Then the raw material powders were mixed in a high-speed stirring mixer at 1500 rpm at room temperature for 15 minutes for a uniform mixture.

The resulting mixture was then preliminarily calcined in a box-shaped electric furnace at 700° C. for 4 hours, and then calcined at 1030° C. for 5 hours to obtain core precursor particles for forming a core (sometimes referred to as lithium-containing composite oxide particles hereinbelow).

Next, 3.0 g of lanthanum nitrate hexahydrate (WAKO PURE CHEMICAL INDUSTRIES, LTD.) and 2.5 g of titanyl sulfate (TM crystals, TAYCA CORPORATION) were separately measured out, and dissolved in 20 mL of pure water to prepare solution (1). To 100 mL of pure water, 3.0 g of sodium carbonate (WAKO PURE CHEMICAL INDUSTRIES, LTD.) as a pH adjusting agent was added to prepare Solution (2), and 100 g of the core precursor particles prepared above were added thereto to prepare dispersion (1).

Solution (1) was added dropwise into dispersion (1) under stirring to prepare dispersion (2). The pH of dispersion (2) was measured and confirmed to be stable at about pH=8.0. Then the dispersion (2) was filtered and the resulting cake was washed with 200 mL of pure water.

The washed cake was calcined by heating at a temperature-raising rate of 5° C./min up to 600° C. and maintained for 3 hours to obtain a cathode active material powder. The average particle size (D50) of the obtained powder as determined by laser diffraction was 17.1 µm.

Figure 2:
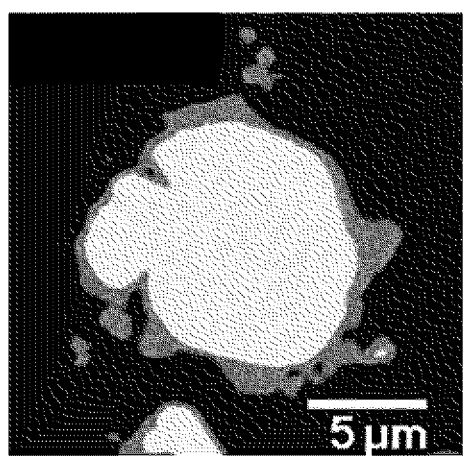
FIG. 2 is a photocopy of a sectional image (COMPO image) obtained by EPMA, of the cathode active material powder prepared in Example 1.

A sectional image of the obtained cathode active material powder was observed with an electron probe micro analyzer (EPMA). A photocopy of the sectional image is shown in FIG. 2. The figure shows that the obtained powder has a core-shell structure.

The obtained powder was subjected to powder X-ray diffraction (XRD) with an X-ray diffractometer (Ultima IV, RIGAKU CORPORATION) to observe diffraction peaks. The results are shown in FIG. 1. The figure shows that no peak was observed at 32.5±1.0°, i.e., the shell structure of the obtained powder was amorphous.

The composition of the obtained cathode active material powder and the kind of the constitutional elements of the shell were analyzed by the ICP method. The results are shown in Table 1.

The Co and Li contained in the shell had migrated from the core precursor particles for forming the core to the shell during the pH adjustment and the calcination. The Na contained in the shell was derived from sodium carbonate used in the pH adjustment.

In Table 1, the values under "Amount in Coating (wt %)" for Shell are for estimating the ratio of the shell in the obtained cathode active material powder of the core-shell structure. The ratio of the shell is the ratio of the La and Ti in the lanthanum nitrate hexahydrate and the titanyl sulfate used in forming a shell, calculated with respect to the total weight of all the elements in the precursor particles for forming the core as being 100, assuming that all of the La and Ti in the lanthanum nitrate hexahydrate and the titanyl sulfate constitute the shell as oxides.

The average thickness of the shell and the contents of La, Ti, and Co in the shell extending from the outermost surface of the obtained cathode active material powder to the core-shell boundary were measured using a scanning X-ray photoelectron spectroscope. The measurements of the contents were made by the ICP method. As a result, it was observed that the content of each of La, Ti, and Co in the shell indicated concentration gradient.

In Table 2, the "Concentration Gradient (%)" was calculated from the formula: (La or Ti concentration at the shell boundary of the core-shell structure/La or Ti concentration on the external surface of the shell)×100 for La and Ti, and from the formula: ((Co concentration on the external surface of the shell)/(Co concentration at the shell boundary of the core-shell structure))×100 for Co. These results show that in the cathode active material powder prepared in Example 1, no La was present at the boundary of the core-shell structure.

The specific surface area of the obtained cathode active material powder was determined by the BET method. The core/shell Co concentration ratio (A/B) was calculated by the ICP method from Co concentration A in the core and Co concentration B on the shell external surface. The results are shown in Table 2.

<Fabrication of Battery>

Next, the obtained cathode active material powder, graphite and acetylene black as electrically conductive materials, and polyvinylidene fluoride as a binder were mixed at a mass ratio of 200:4:1:10, and kneaded with N-methylpyrrolidone into an electrode slurry. The electrode slurry thus obtained was applied on aluminum foil of 20 µm thick, dried, pressure formed in a press into a thickness of 40 µm, and cut into a prescribed size, to thereby obtain a cathode.

With the cathode thus obtained, a coin cell rechargeable battery for testing was fabricated in the following manner. Lithium metal foil as a counter electrode (anode) and the cathode obtained above as a testing electrode were placed in a battery case with the intervention of a separator therebetween. An electrolyte prepared by dissolving at 1 M a support electrolyte $LiPF_6$ in a 1:2 (by volume) mixed solvent of ethylene carbonate and dimethyl carbonate, was introduced into the case to obtain a coin cell rechargeable battery.

Example 2

Lithium-containing composite oxide particles as core precursor particles were obtained as raw material powder under the same conditions as in Example 1.

Cathode active material powder was obtained in the same way as in Example 1, except that 1.5 g of lanthanum nitrate hexahydrate (WAKO PURE CHEMICAL INDUSTRIES, LTD.) and 1.25 g of titanyl sulfate (TM crystals, TAYCA CORPORATION) were separately measured out, and dissolved in 10 mL of pure water to prepare solution (1). The average particle size (D50) of the obtained powder as determined by laser diffraction was 17.0 µm.

With the cathode active material powder thus obtained, a coin cell rechargeable battery was fabricated in the same way as in Example 1 and subjected to Charge/Discharge Tests 1 and 2. The composition and properties of the cathode active material powder and the battery performance are shown in Tables 1 and 2. Further, the diffraction peaks were observed by XRD of the obtained cathode active material powder in the same way as in Example 1. The results are shown in FIG. 1.

Example 3

Lithium-containing composite oxide particles as core precursor particles were obtained as raw material powder under the same conditions as in Example 1.

Cathode active material powder was obtained in the same way as in Example 1, except that 0.6 g of lanthanum nitrate hexahydrate (WAKO PURE CHEMICAL INDUSTRIES, LTD.) and 0.5 g of titanyl sulfate (TM crystals, TAYCA CORPORATION) were separately measured out, and dissolved in 4 mL of pure water to prepare solution (1). The average particle size (D50) of the obtained powder as determined by laser diffraction was 16.9 μm.

With the cathode active material powder thus obtained, a coin cell rechargeable battery was fabricated in the same way as in Example 1 and subjected to Charge/Discharge Tests 1 and 2. The composition and properties of the cathode active material powder and the battery performance are shown in Tables 1 and 2.

Example 4

Lithium-containing composite oxide particles as core precursor particles were obtained as raw material powder under the same conditions as in Example 1.

Cathode active material powder was obtained in the same way as in Example 1, except that 0.3 g of lanthanum nitrate hexahydrate (WAKO PURE CHEMICAL INDUSTRIES, LTD.) and 0.25 g of titanyl sulfate (TM crystals, TAYCA CORPORATION) were separately measured out, and dissolved in 2 mL of pure water to prepare solution (1). The average particle size (D50) of the obtained powder as determined by laser diffraction was 17.0 μm.

With the cathode active material powder thus obtained, a coin cell rechargeable battery was fabricated in the same way as in Example 1 and subjected to Charge/Discharge Tests 1 and 2. The composition and properties of the cathode active material powder and the battery performance are shown in Tables 1 and 2.

Figure 3:
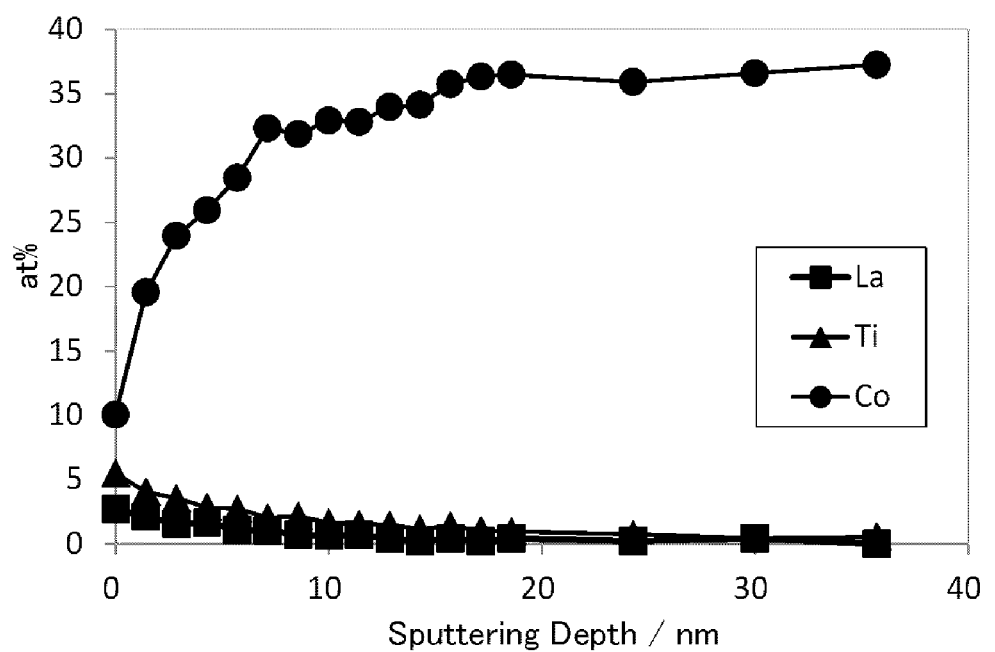
FIG. 3 is a graph illustrating the La, Ti, and Co concentration gradients in the shell of the cathode active material powder prepared in Example 4.

Graphs showing the La, Ti, and Co concentration gradients in the shell of the obtained cathode active material powder are shown in FIG. 3. In the figure, the sputtering depth (nm) along the X-axis is the depth (nm) from the shell external surface toward the shell boundary of the core-shell structure. FIG. 3 indicates that, from the shell external surface toward the shell boundary of the core-shell structure, the La and Ti concentrations gradually decrease while the Co concentration gradually increases.

Example 5

Lithium-containing composite oxide particles as core precursor particles were obtained as raw material powder under the same conditions as in Example 1.

Next, a cake was obtained in the same way as in Example 1. Cathode active material powder and a coin cell rechargeable battery were produced in the same way as in Example 1 and subjected to Charge/Discharge Tests 1 and 2, except that the calcination temperature for the cake was changed to 550° C. The composition and properties of the cathode active material powder and the battery performance are shown in Tables 1 and 2. Further, the diffraction peaks were observed by XRD in the same way as in Example 1. The results are shown in FIG. 1.

Example 6

Core precursor particles for forming the core were obtained in the same way as in Example 1, except that 97.0 g of lithium carbonate, 210 g of cobalt oxide, 2.4 g of aluminum hydroxide, 1.2 g of magnesium hydroxide, 0.2 g of titanium oxide, 0.3 g of zirconium oxide, and 6.8 g of sodium carbonate were used as the raw material powders.

Then, cathode active material powder was obtained in the same way as in Example 1. The average particle size (D50) of the obtained powder as determined by laser diffraction was 17.4 μm.

With the cathode active material powder thus obtained, a coin cell rechargeable battery was fabricated in the same way as in Example 1 and subjected to Charge/Discharge Tests 1 and 2. The composition and properties of the cathode active material powder and the battery performance are shown in Tables 1 and 2.

Comparative Example 1

Lithium-containing composite oxide particles were obtained in the same way as in Example 1.

With the lithium-containing composite oxide particles thus obtained instead of the cathode active material powder of Example 1, a coin cell rechargeable battery was fabricated in the same way as in Example 1 and subjected to Charge/Discharge Tests 1 and 2. The composition and properties of the cathode active material powder and the battery performance are shown in Tables 1 and 2.

Comparative Example 2

Lithium-containing composite oxide particles as core precursor particles were obtained in the same way as in Example 1.

Then, cathode active material powder was prepared in the same way as in Example 1, except that the calcination temperature for the cake obtained in the same way as in Example 1 was changed to 900° C. With the cathode active material powder thus obtained, a coin cell rechargeable battery was fabricated in the same way as in Example 1 and subjected to Charge/Discharge Tests 1 and 2. The composition and properties of the cathode active material powder and the battery performance are shown in Tables 1 and 2. Further, the diffraction peaks were observed by XRD in the same way as in Example 1. The results are shown in FIG. 1.

Comparative Example 3

Lithium-containing composite oxide particles as core precursor particles were obtained in the same way as in Example 1.

Next, 0.03 g of lanthanum nitrate hexahydrate (WAKO PURE CHEMICAL INDUSTRIES, LTD.) and 0.025 g of titanyl sulfate (TM crystals, TAYCA CORPORATION) were separately measured out, and dissolved in 0.2 mL of pure water to prepare solution (1). To 100 mL of pure water, 100 g of the core precursor particles prepared above were added to prepare dispersion (1).

Cathode active material powder was obtained in the same way as in Example 1, except that solution (1) was added dropwise into dispersion (1) under stirring to prepare dispersion (2), and filtered.

With the cathode active material powder thus obtained, a coin cell rechargeable battery was fabricated in the same way as in Example 1 and subjected to Charge/Discharge Tests 1 and 2. The composition and properties of the cathode active material powder and the battery performance are shown in Tables 1 and 2.

TABLE 1

Composition of Cathode Active Material Powder $(Li_{x-w}Na_wCo_{1-y}M_yO_{2+z})$

| | x − w | w | 1 − y | y(M) (Al) | (Mg) | (Ti) | (Zr) | (La) | Total | Shell Component | Amount in Coating (wt %) | Calcination Temperature (° C.) |
|---|---|---|---|---|---|---|---|---|---|---|---|---|
| Ex. 1 | 0.996 | 0.000062 | 0.964 | 0.0108 | 0.0078 | 0.0099 | 0.0010 | 0.0063 | 0.036 | Li, Na, La, Ti, Co, O | 2.0 | 600 |
| Ex. 2 | 1.004 | 0.000037 | 0.972 | 0.0109 | 0.0078 | 0.0053 | 0.0010 | 0.0032 | 0.028 | Li, Na, La, Ti, Co, O | 1.0 | 600 |
| Ex. 3 | 1.007 | 0.000032 | 0.977 | 0.0107 | 0.0078 | 0.0027 | 0.0010 | 0.0012 | 0.023 | Li, Na, La, Ti, Co, O | 0.4 | 600 |
| Ex. 4 | 1.018 | 0.000032 | 0.978 | 0.0108 | 0.0078 | 0.0018 | 0.0010 | 0.0006 | 0.022 | Li, Na, La, Ti, Co, O | 0.2 | 600 |
| Ex. 5 | 0.996 | 0.000050 | 0.965 | 0.0108 | 0.0078 | 0.0098 | 0.0010 | 0.0061 | 0.036 | Li, Na, La, Ti, Co, O | 2.0 | 550 |
| Ex. 6 | 1.020 | 0.010000 | 0.963 | 0.0108 | 0.0078 | 0.0110 | 0.0010 | 0.0064 | 0.037 | Li, Na, La, Ti, Co, O | 2.0 | 600 |
| Comp. Ex. 1 | 1.006 | 0 | 0.980 | 0.0107 | 0.0078 | 0.0010 | 0.0010 | 0 | 0.021 | — | — | — |
| Comp. Ex. 2 | 1.004 | 0.000062 | 0.963 | 0.0107 | 0.0078 | 0.0105 | 0.0010 | 0.0068 | 0.037 | Li, Na, La, Ti, Co, O | 2.0 | 900 |
| Comp. Ex. 3 | 1.016 | 0.000073 | 0.979 | 0.0107 | 0.0078 | 0.0010 | 0.0010 | 0.0001 | 0.021 | Li, La, Ti, Co, O | 0.02 | 600 |

TABLE 2

| | Shell XRD: Full Width at Half Maximum of Peak near 32.5 ± 1.0° | Structure | Average Thickness (nm) | Concentration Gradient (%)*1 La | Ti | Co | Core/Shell Co Concentration Ratio (A/B) |
|---|---|---|---|---|---|---|---|
| Ex. 1 | No peak | Amorphous | 928 | 0.0 | 0.4 | 26 | 3.8 |
| Ex. 2 | No peak | Amorphous | 410 | 0.0 | 0.8 | 32 | 3.2 |
| Ex. 3 | No peak | Amorphous | 176 | 0.0 | 1.1 | 36 | 2.9 |
| Ex. 4 | No peak | Amorphous | 35 | 0.0 | 0.9 | 40 | 2.5 |
| Ex. 5 | No peak | Amorphous | 1008 | 0.0 | 1.6 | 22 | 4.2 |
| Ex. 6 | No peak | Amorphous | 910 | 0.0 | 0.3 | 25 | 4 |
| Comp. Ex. 1 | No peak | — | — | — | — | — | — |
| Comp. Ex. 2 | 0.18 | Crystalline | 1100 | 0.0 | 0.9 | 45 | 2.2 |
| Comp. Ex. 3 | No peak | Amorphous | 3 | 0.0 | 0.2 | 92 | 1.1 |

| | Specific Surface Area ($m^2/g$) (BETMethod) | Maximum Charging Voltage 4.6 V | | Maximum Charging Voltage 4.5 V | |
|---|---|---|---|---|---|
| | | Discharge Capacity at 1st Cycle (mAh/g) | Capacity Retention (%) | Discharge Capacity at 1st Cycle (mAh/g) | Capacity Retention (%) |
| Ex. 1 | 0.67 | 205.6 | 76.1 | 178.8 | 93.1 |
| Ex. 2 | 0.42 | 210.8 | 64.9 | 183.6 | 92.3 |
| Ex. 3 | 0.28 | 211.0 | 55.5 | 184.5 | 92.4 |
| Ex. 4 | 0.23 | 211.4 | 54.6 | 185.2 | 91.4 |
| Ex. 5 | 0.72 | 197.8 | 60.0 | 177.1 | 91.4 |
| Ex. 6 | 0.64 | 203.6 | 77.0 | 177.3 | 92.6 |
| Comp. Ex. 1 | 0.18 | 214.4 | 20.5 | 183.8 | 88.3 |
| Comp. Ex. 2 | 0.65 | 211.2 | 21.2 | 182.1 | 81.4 |
| Comp. Ex. 3 | 0.2 | 211.1 | 32 | 185.3 | 85.5 |

*1La, Ti: (La or Ti concentration at the shell boundary of the core/shell structure)/(La or Ti concentration on the shell external surface) × 100 Co: (Co concentration on the shell external surface)/(Co concentration at the shell boundary of the core-shell structure)) × 100

Table 2 clearly indicates that the rechargeable batteries wherein the cathode active material powders of Examples 1 to 6 were used, were significantly superior in cycle characteristics at the maximum charge voltage of 4.6 V, compared to those of Comparative Examples.

What is claimed is:

1. A cathode active material powder for a nonaqueous electrolyte rechargeable battery, said cathode active material powder having the following formula (I):

$$Li_{x-w}Na_wCo_{1-y}M_yO_{2+z} \quad (I)$$

wherein x, y, z, and w satisfy 0.950≤x≤1.100, 0<y≤0.050, −0.1≤z≤0.1, and 0≤w≤0.020, respectively; M contains Ti and La, and optionally contains one or more elements selected from the group consisting of Mg, Zr, and Al, wherein said cathode active material powder has a core-shell structure consisting of a lithium-containing composite oxide region as a core and a Li-ion-conductive oxide region as a shell, wherein said cathode active material powder is produced by a method containing the steps of coating core precursor particles at least partly with a raw shell material and calcining the resultant at a temperature of not lower than 550° C. and not higher than 700° C. for 1 to 24 hours, wherein said core comprises Li, Co, and oxygen, and has a Co concentration ratio of not lower than 22% and not higher than 90% as calculated by formula (II):

((Co concentration on external surface of shell)/(Co concentration at boundary between core and shell in core-shell structure))×100    (II)

and
wherein said shell is an amorphous layer comprising La, Ti, Co, and oxygen, covering said core at least partly.

2. The cathode active material powder according to claim 1, wherein said amorphous layer is 5 to 2000 nm in thickness.

3. The cathode active material powder according to claim 1, wherein a La concentration ratio as calculated by formula (III):

(La concentration at boundary between core and shell in core-shell structure/La concentration on external surface of shell)×100   (III)

is not higher than 5%.

4. The cathode active material powder according to claim 3, wherein said La concentration ratio is 0.

5. The cathode active material powder according to claim 1, wherein a Ti concentration as calculated by formula (IV):

(Ti concentration at boundary between core and shell in core-shell structure/Ti concentration on external surface of shell)×100   (IV)

is not higher than 5%.

6. The cathode active material powder according to claim 1, wherein a ratio of Co concentration A in the core to Co concentration B in the shell (AB) is 1.1 to 5.0.

7. The cathode active material powder according to claim 1, wherein said shell further comprises Li, Na, or K.

8. The cathode active material powder according to claim 1, wherein said core comprises Na.

9. The cathode active material powder according to claim 1, wherein said core is free of rare earth elements.

10. The cathode active material powder according to claim 1, wherein said cathode active material powder has a specific surface area of 0.1 to 1.0 $m^2/g$.

11. A cathode for a nonaqueous electrolyte rechargeable battery comprising a cathode active material powder of claim 1, an electrically conductive material, and a binder.

12. A rechargeable battery comprising a cathode of claim 11, an anode, a nonaqueous electrolyte, and a separator.

* * * * *